April 28, 1942.　　　　M. H. RHODES　　　　2,281,514
TIMING DEVICE
Filed Aug. 3, 1940　　　　3 Sheets-Sheet 1

Marcus H. Rhodes
Inventor
Haynes and Koenig
Attorneys

April 28, 1942.　　　M. H. RHODES　　　2,281,514
TIMING DEVICE
Filed Aug. 3, 1940　　　3 Sheets-Sheet 2
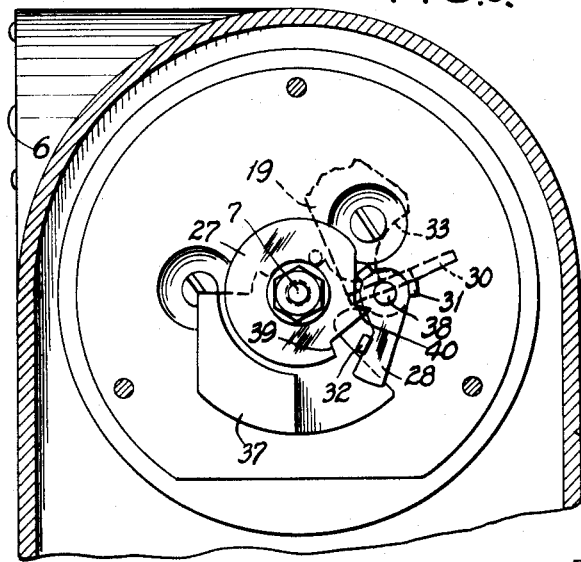
FIG.6.
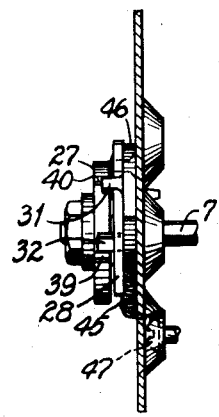
FIG.13.
FIG.7.
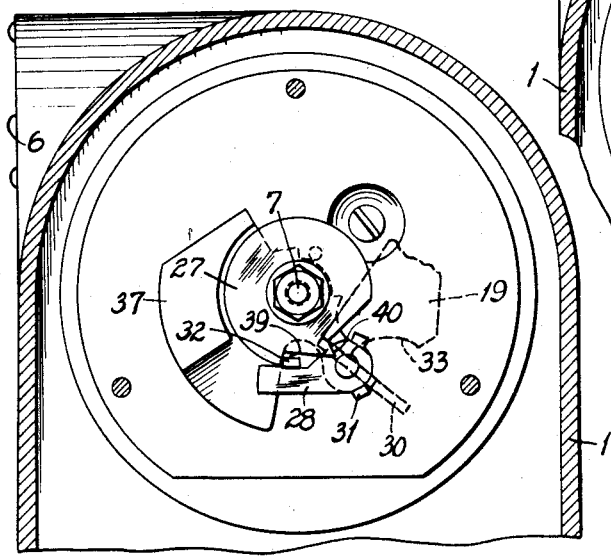
FIG.12.
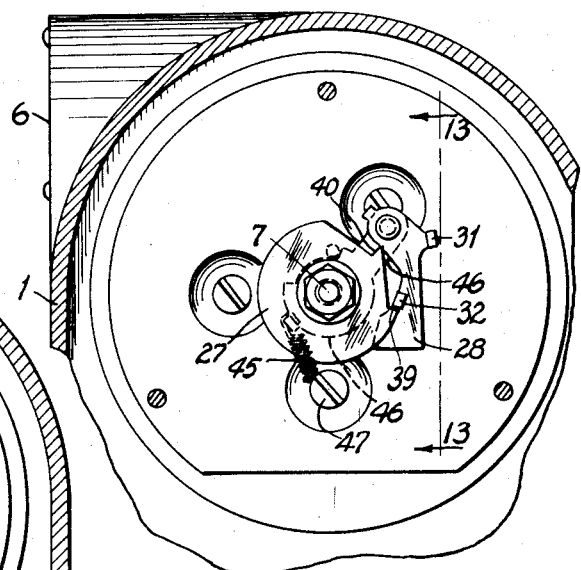
Marcus H. Rhodes
Inventor
Haynes and Koenig
Attorneys April 28, 1942.  M. H. RHODES  2,281,514
TIMING DEVICE
Filed Aug. 3, 1940   3 Sheets-Sheet 3

Marcus H. Rhodes
Inventor
Haynes and Koenig
Attorneys

UNITED STATES PATENT OFFICE 2,281,514

TIMING DEVICE

Marcus H. Rhodes, Hartford, Conn., assignor to M. H. Rhodes, Inc., Hartford, Conn., a corporation of Delaware Application August 3, 1940, Serial No. 350,915

4 Claims. (Cl. 194—72)

This invention relates to timing devices, and with regard to certain more specific features, to coin-controlled timing devices for indicating the passage of a purchased length of time, as for parking automobiles or the like.

Among the several objects of the invention may be noted the provision of a coin-controlled timing device of the class described which is adapted for use with multiple coins; the provision of a device of the character indicated which provides multiples of a predetermined period of time upon the deposit of a multiple number of coins; and the provision of a device of the class described which is substantially fool-proof in operation, simple in construction and which may be economically made. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a front elevation of a device embodying the present invention;

Fig. 6 is a section taken along the line 6—6 in Fig. 5;

Fig. 7 is a section similar to Fig. 6, but showing a different position of the mechanism;

Fig. 12 is a section similar to Fig. 6, but showing an alternative embodiment of the invention; and, Fig. 13 is a view taken along the line 13—13 in Fig. 12.

Similar reference characters indicate corresponding parts throughout the several views of the drawings.

Figure 1:
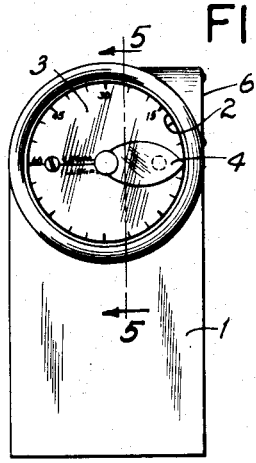
Figure 2:
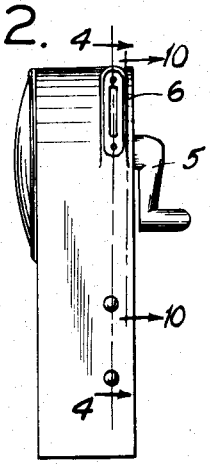
Fig. 2 is a right side elevation of the Fig. 1 device.
Figure 3:
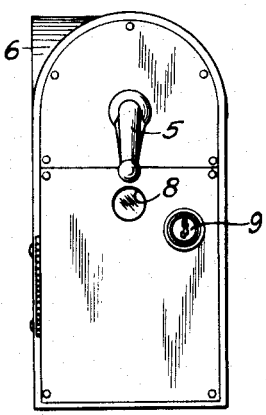
Fig. 3 is a rear elevation of the same device.

The device of the present invention is particularly adapted for use as a so-called "parking meter" which is usually installed in connection with designated parking spaces for automobiles along the curbs of city streets. The timing device itself is usually mounted on a post on the curb in proximity to the designated parking space. The device is adapted to receive a coin from a person parking his automobile in the designated space, and has means thereon for indicating a duration or period of time corresponding to the length of time a person is entitled to park in the designated space in return for the value of a coin presented.

One of the principal features of the present invention is that it will set a multiple of a predetermined period of time upon the deposit therein of a multiple number of coins. Thus the parker may select a period of time best suited to his own purposes, and upon depositing coins of the appropriate amount, may set the predetermined period of time upon the device. He need not purchase a period of time far in excess of his needs with the consequent necessity of providing someone else with a period of free time for parking.

Referring now to the drawings, numeral 1 indicates a rectangular casing which has a semi-circular top portion. The top part of the front of the casing 1 has a circular opening 2, preferably holding a glass. Back of this is a scale 3 upon which are figures to indicate the amount of legal parking time, and also the amount of any overtime which may have elapsed. In front of this scale, and movable thereover by clockwork mechanism, is a pointer 4, which rotates over the scale 3 to indicate the expiration of a purchased period of time, and also the lapse of a period of overtime. Initiation of the operation of the device is carried out by means of a handle 5, which operates the setting mechanism upon the insertion of a coin into the coin slot 6. Pointer 4 is attached to a shaft 7 which is rotated by the clockwork mechanism.

The back of the device is provided with a viewing disc 8 arranged opposite the place where the coin is held during operation of the device, and also with an appropriate lock, such as a screw lock 9.

The device has an appropriate coin receptacle (not shown), for permanent retention of coins. This is located in the lower portion of the casing 1 and may be of any convenient type. Temporary coin holder 10 is connected to the receptacle and is located opposite viewing glass 8, which may preferably be constructed of magnifying glass. The coin is held in temporary coin holder 10 by a spring arm or other convenient means.

Figure 4:
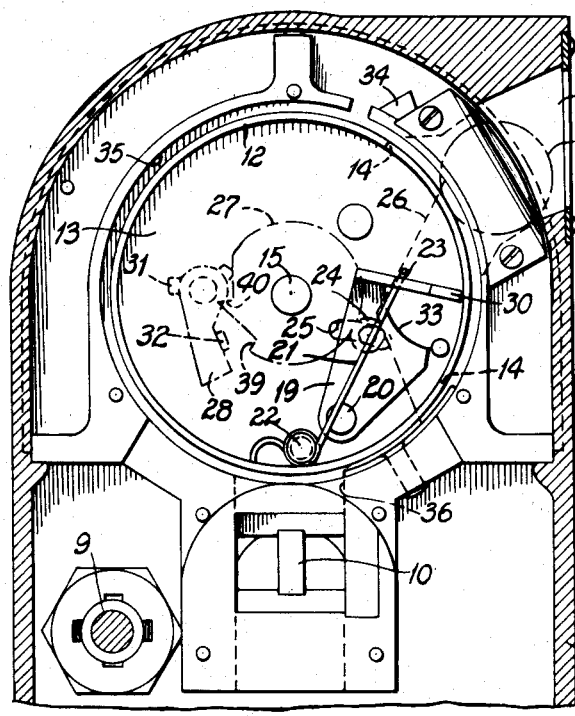
Fig. 4 is a section taken along the line 4—4 in Fig. 2, but on an enlarged scale.
Figure 5:
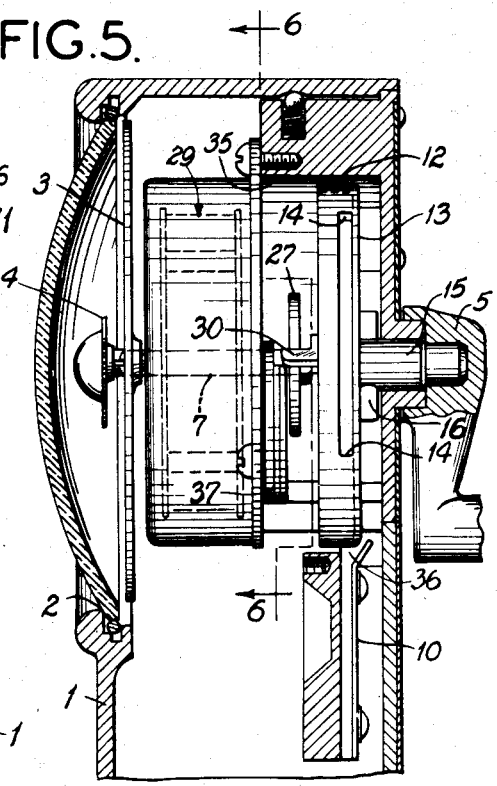
Fig. 5 is a section taken along the line 5—5 in Fig. 1, but on an enlarged scale.

Fig. 4 shows the device ready for the reception of a coin 11. Numeral 12 indicates a circular wall or cylinder, which is preferably formed integrally with a plate 13, as by die casting and acts to prevent insertion of a coin except at the intended place. The cylinder 12 is not a complete cylinder, but is provided with a relatively wide opening 14. The plate 13 is rotatably mounted upon a shaft 15, upon which is also mounted the handle 5. Located between the plate 13 and the back of the case, and also mounted upon shaft 15 is a ratchet 16 which cooperates with a pawl 17 to permit rotation of the plate 13 in one direction, but not in the other (see Fig. 10). Spring 18 retains pawl 17 in position. Movably mounted on plate 13 is arm 19 by means of rivet 20. Spring 21 attached to plate 13 by means of rivet 22 and to arm 19 by means of opening 23 positions arm 19 in the proper relationship to the remainder of the device.

Figure 10:
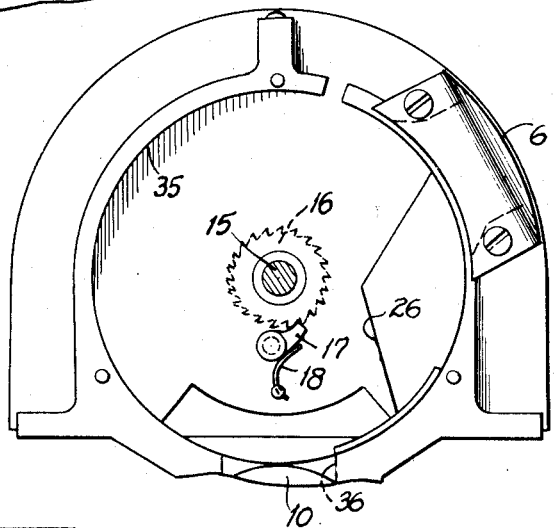
Fig. 10 is a section taken along the line 10—10 in Fig. 2, but on an enlarged scale.
Figure 9:
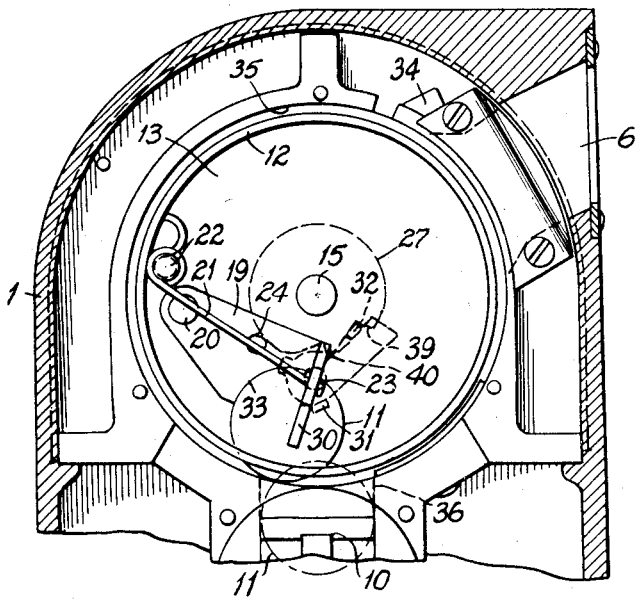
Fig. 9 is a section similar to Figures 4 and 8, but showing a still different position of the mechanism.

Projection 24 on arm 19 which projects through opening 25 in plate 13 controls and limits the movement of arm 19 in cooperation with flat wedge 26, located between plate 13 and the back of the device (see Fig. 10).

In front of the setting mechanism is located a ratchet 27 which cooperates with a pawl 28. Ratchet 27 is mounted upon shaft 7 which carries the clockwork mechanism indicated generally at 29. Ratchet 27 winds the clockwork mechanism upon initiation of operation of the device by the plate 13 and members assembled therewith. Lug 30 on arm 19 is positioned to contact finger 31 on pawl 28 under certain conditions of operation and carry out the winding operation. Pawl 28 operates ratchet 27 by means of lug portion 32.

Figure 8:
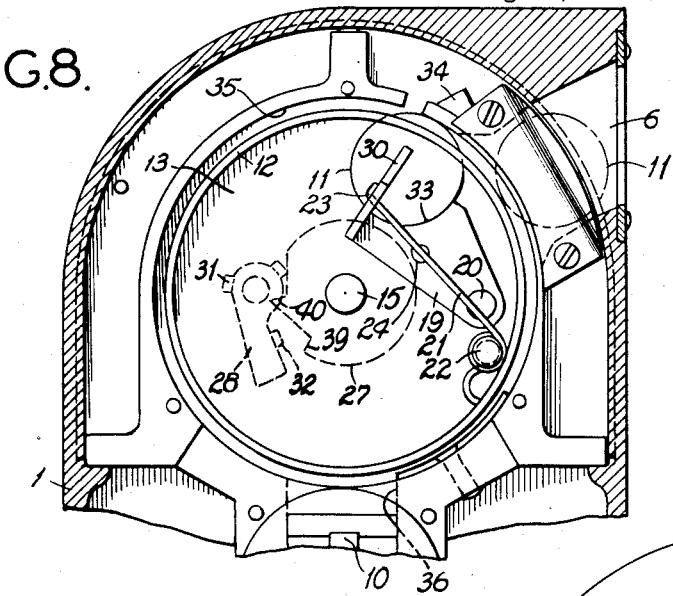
Fig. 8 is a section similar to Fig. 4, but showing a different position of the mechanism.

The operation of the device is as follows:

When the plate 13 assembly is in the position shown in Fig. 4, with the opening 14 opposite the coin chute 6, it is ready to receive a coin 11 which is inserted through the coin slot 6, and drops into the semi-circular segment 33 of arm 19. If the handle 5 is now rotated, carrying with it the plate 13 and assembly, projecting portion 24 attached to arm 19 contacts wedge 26 tensioning spring 21, by moving arm 19 toward the center of the assembly. This permits the coin 11 to assume by gravity the position shown in Fig. 8, where it is held between the semi-circular segment 33 of arm 19, and the interior wall 35 of the case 1. This retains the tension in spring 21. With the coin in position as shown in Fig. 8, lug 30 on arm 19 is brought into position to contact finger 31 on pawl 28, as shown in Fig. 6. Further rotation of the handle 5 and the plate 13 assembly then begins winding the timing mechanism. This winding continues until the opening 14 is brought opposite the chute 36 leading to coin holder 10. When the coin 11 reaches this position, it is discharged into coin holder 10, releasing the tension on spring 21, so that the device is again in the condition shown in Fig. 4. Fig. 7 shows the position of the winding mechanism as the coin 11 is dropped. In this position without a coin, the rotation of the handle 5 will not operate the winding mechanism through pawl 28 and ratchet 27, since lug 30 clears finger 31 on pawl 28. The winding operation has simultaneously set a predetermined period of time on scale 3 by movement of pointer 4.

Hanging loosely upon shaft 7 is a counterweight 37 of any suitable construction. Pawl 28 is attached to this counterweight at 38 as shown. This counterweight positions pawl 28 to cooperate with ratchet 27 and carry out the winding operation described. When the device is in the run-down position, as shown in Fig. 1, pawl 28 is positioned by counterweight 37, so that lug 32 will contact the first of the teeth 39 in ratchet 27, and the winding operation will be carried out by operating upon this tooth 39. However, once the operation is completed, counterweight 37 will position pawl 28, especially the lug 32 portion, opposite and ready to cooperate with tooth 40. If another coin 11 is now inserted into coin slot 6, and the winding operation again carried out as described, pawl 28 will operate upon tooth 40 of ratchet 27 to further wind the clockwork mechanism and set a further period of time upon the dial 3 by means of movement of pointer 4. The winding mechanism and the clockwork are adjusted so that sufficient winding is given by the rotation of ratchet 27 as caused by pawl 28 contacting tooth 39 to operate the pointer 4 over the scale 3 for a predetermined unit of time. The position of tooth 40 in relation of tooth 39 is adjusted so that the additional winding given by a subsequent coin sets an additional period of time upon scale 3 by means of pointer 4, and winds the clockwork mechanism to carry out the additional period purchased. The clockwork mechanism and associated winding means, that is, ratchet 27, may be adjusted so that sufficient winding is imparted by the first coin to operate the pointer 4, not only over the purchased period of time, but over a predetermined period of overtime.

Figure 11:
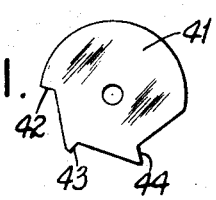
Fig. 11 is a plan view of an alternative form of the ratchet.

Fig. 11 illustrates a ratchet 41 which may be substituted for the ratchet 27 in the device already described. Ratchet 41, it will be noted, has three teeth 42, 43 and 44. As a result, three separate periods of time may be cumulatively set upon the timing device by the use of three different coins. Similarly a ratchet with four or more teeth may be provided for setting four or more cumulative periods of time upon the deposit of four or more different coins in the device and by the operation of the plate 13 winding assembly for the requisite number of times. By properly positioning the ratchet upon the shaft 7, the pawl 28 will be properly positioned by counterweight 37 to contact the appropriate tooth on the ratchet to wind the proper period.

Figures 12 and 13 illustrate an alternative embodiment of the invention. Here a spring 45, attached to the case by means of a screw 47, operates through a member 46 to properly position the pawl 28 to carry out the operation as above described. Spring 45 thus takes the place of and functions similarly to counterweight 37 in the previous embodiment of the invention.

The scale 3 may be of any of the types customarily employed for parking meters. However, it is preferable that the portion which indicates illegal or overtime parking shall be painted red, so as to facilitate reading by the patrolling officer, and also to provide a positive indication to the parker and to the public.

The coin 11 is preferably held in temporary holder 10 until the next coin is discharged into chute 36. The second coin will then force the previous coin into the permanent coin receptacle and will replace it before the window 8.

From the foregoing it will be apparent that the device of the present invention may be constructed to operate with a plurality of coins of a given denomination, and to provide a predetermined period of time for each coin which cumulates as the coins are inserted and the device is operated to wind the mechanism. Thus, twice a predetermined period of time is obtained for two coins, three times the predetermined time is obtained for three coins, and so on. By increasing the number of teeth in the ratchet mounted upon shaft 7, the device may be constructed to operate with any desired number of coins, and to deliver any desired number of units of time. The user of the device is therefore enabled to select a period of time which most closely suits his needs, and need not purchase an additional period of time which may be of no use to him. He therefore does not have the annoying experience of leaving a given parking space while a large amount of time for which he has paid is still unexhausted and running on the meter, providing a windfall for some subsequent motorist who may happen to pass. Parkers are therefore encouraged to use the device for short periods of time, thus enabling the limited number of parking spaces available to serve the largest number of citizens. Since parking meters are in general installed in business sections of town, retail merchants whose stores may be in this area will benefit from increased patronage, since people are encouraged to come there to park for short periods of time and make their purchases, rather than to patronize shopping centers in outlying districts.

In view of the above it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

What is claimed is:

1. In a timing device, a casing having coin entrance and exit slots, clock mechanism within said casing, a main shaft associated with said clock mechanism, a coaxial shaft, an operating member for said second shaft, a winding ratchet on said first shaft, a pawl for operatively engaging said ratchet on insertion of a coin in said entrance slot and movement of said operating member, a coin carrying assembly on said second shaft movable on the insertion of a coin to carry a part thereof radially into position to engage and move the pawl into engagement with the ratchet thereby to wind the clock mechanism a predetermined amount prior to releasing the coin to the exit slot when the pawl and ratchet are disengaged and the coin carrying assembly is returned to normal to receive a second coin, and means to position the pawl opposite the next tooth on the ratchet whereby on insertion of a second coin and movement of the member a second predetermined period of time is cumulatively wound on said clock mechanism.

2. In a timing device, a casing having coin entrance and exit slots, clock mechanism within said casing, a main shaft associated with said clock mechanism, a coaxial shaft, an operating member for said second shaft, a winding ratchet on said first shaft, a pawl for operatively engaging said ratchet on insertion of a coin in said entrance slot and movement of said operating member, a coin-carrying assembly on said second shaft movable on the insertion of a coin to carry a part thereof radially into position to engage and move the pawl into engagement with the ratchet thereby to wind the clock mechanism a predetermined amount prior to releasing the coin to the exit slot when the pawl and ratchet are disengaged and the coin-carrying assembly is returned to normal to receive a second coin, means to position the pawl opposite the next tooth on the ratchet whereby on insertion of a second coin and movement of the member a second predetermined period of time is cumulatively wound on said clock mechanism, and means for indicating the unexpired portion of the predetermined period or periods.

3. In a timing device, a casing having coin entrance and exit slots, clock mechanism within said casing, a main shaft associated with said clock mechanism, a coaxial shaft, an operating handle for said second shaft, a winding ratchet on said first shaft, a pawl for operatively engaging said ratchet on insertion of a coin into said casing and movement of said handle, a coin carrying assembly on said second shaft movable on the insertion of a coin to carry a part thereof radially into position to engage and move the pawl into engagement with the ratchet thereby to wind the clock mechanism a predetermined amount prior to releasing the coin and when the pawl and ratchet are disengaged and the coin carrying assembly is free to return to normal to receive a second coin, a counterweight directly connected with said pawl for positioning the pawl opposite the next tooth on the ratchet whereby on insertion of a second coin and movement of the handle a second predetermined period of time is cumulatively wound on said clock mechanism, and indicating means on one side of the casing for indicating the unexpired portion of the predetermined period or periods.

4. In a timing device, a casing having coin entrance and exit slots, a viewing disc in said casing opposite which a coin is held during operation of the device, clock mechanism within said casing, a main shaft associated with said clock mechanism, a coaxial shaft, an operating handle for said second shaft, a winding ratchet on said first shaft, a pawl for operatively engaging said ratchet on insertion of a coin into said casing and movement of said handle, a coin-carrying assembly on said second shaft movable on the insertion of a coin to carry a part thereof radially into position to engage and move the pawl into engagement with the ratchet thereby to wind the clock mechanism a predetermined amount prior to releasing the coin and when the pawl and ratchet are disengaged and the coin-carrying assembly is free to return to normal to receive a second coin, a counterweight directly connected with said pawl for positioning the pawl opposite the next tooth on the ratchet whereby on insertion of a second coin and movement of the handle a second predetermined period of time is cumulatively wound on said clock mechanism, and indicating means on one side of the casing for indicating the unexpired portion of the predetermined period or periods.

MARCUS H. RHODES.